(12) United States Patent
Xiong et al.

(10) Patent No.: US 10,487,215 B2
(45) Date of Patent: Nov. 26, 2019

(54) POLYACRYLIC ACID COPOLYMER EMULSION, ORGANIC-INORGANIC COMPOSITE WATERPROOF COATING, PREPARATION METHOD THEREOF AND WATERPROOF COILED MATERIAL

(71) Applicant: Beijing Oriental Yuhong Waterproof Technology Co., Ltd., Beijing (CN)

(72) Inventors: Yuqin Xiong, Beijing (CN); Enshun Xu, Beijing (CN); Weiguo Li, Beijing (CN); Wenfeng Duan, Beijing (CN)

(73) Assignee: Beijing Oriental Yuhong Waterproof Technology Co., Ltd., Beijing (CN)

( * ) Notice: Subject to any disclaimer, the term of this patent is extended or adjusted under 35 U.S.C. 154(b) by 44 days.

(21) Appl. No.: 15/539,069

(22) PCT Filed: Dec. 1, 2015

(86) PCT No.: PCT/CN2015/096120
§ 371 (c)(1),
(2) Date: Jun. 22, 2017

(87) PCT Pub. No.: WO2016/101773
PCT Pub. Date: Jun. 30, 2016

(65) Prior Publication Data
US 2018/0030283 A1 Feb. 1, 2018

(30) Foreign Application Priority Data
Dec. 22, 2014 (CN) .......................... 2014 1 0811091

(51) Int. Cl.
| | |
|---|---|
| C09D 5/02 | (2006.01) |
| C09D 133/02 | (2006.01) |
| C04B 41/45 | (2006.01) |
| C09D 7/47 | (2018.01) |
| C09D 7/41 | (2018.01) |
| C09J 7/00 | (2018.01) |
| C09J 123/22 | (2006.01) |

(52) U.S. Cl.
CPC .......... C09D 5/022 (2013.01); C04B 41/4503 (2013.01); C09D 5/025 (2013.01); C09D 7/41 (2018.01); C09D 7/47 (2018.01); C09D 133/02 (2013.01); C09J 7/00 (2013.01); C09J 123/22 (2013.01)

(58) Field of Classification Search
CPC .......... C09D 5/02; C09D 133/02; C04B 41/45
USPC ....................................................... 428/329
See application file for complete search history.

(56) References Cited

FOREIGN PATENT DOCUMENTS

| | | |
|---|---|---|
| CN | 102604496 | 7/2012 |
| CN | 102725139 | 10/2012 |
| CN | 103625077 | 3/2014 |
| CN | 103965716 | 8/2014 |
| CN | 104479580 | 4/2015 |
| WO | 2013063197 | 5/2013 |

*Primary Examiner* — Deve V Hall
(74) *Attorney, Agent, or Firm* — Kolisch Hartwell, P.C.

(57) ABSTRACT

The present invention provides a polyacrylic acid copolymer emulsion, an organic-inorganic composite waterproof coating, preparation method thereof, and a waterproof coiled material. It can solve the problem that the granules dropping out from the prior waterproof membrane easily. The organic-inorganic composite waterproof coating according to the invention is prepared by compositing organic granules and inorganic granules, wherein the organic coating locks the inorganic granules, and prevents the inorganic granules from dropping out. Some exposed inorganic granules take part in the cement hydration reaction, and increase the bonding strength with the post-poured concrete. Furthermore, the organic-inorganic composite waterproof coating according to the invention does not need a buttering. It can reduce waste without an adhesive-resist insulation film/paper. Experiments prove that the peeling strength between the organic-inorganic composite waterproof coating and the concrete according to the invention is above 2.0 N/mm after being exposed to the sunshine for 8 weeks.

14 Claims, 1 Drawing Sheet

POLYACRYLIC ACID COPOLYMER EMULSION, ORGANIC-INORGANIC COMPOSITE WATERPROOF COATING, PREPARATION METHOD THEREOF AND WATERPROOF COILED MATERIAL

TECHNICAL FIELD

The present invention pertains to the technical field of waterproof coiled materials, and specifically to a polyacrylic acid copolymer emulsion, an organic-inorganic composite waterproof coating and a preparation method thereof, and a waterproof coiled material.

BACKGROUND ART

A macro-molecular self-adhesive film waterproof coiled material (also referred to as "waterproof membrane") is a multi-layer composite waterproof coiled material, for full adhesion to post-cast concrete, i.e., structural concrete, for protection against water. A typical macro-molecular self-adhesive film waterproof coiled material includes a main waterproof layer (also referred to as "main waterproof sheet"), and a pressure-sensitive adhesive layer. Among them, the pressure-sensitive adhesive layer can form a complete continuous adhesion with the post-cast concrete after it is cured.

The inventors have found that there are at least the following problems in the prior art: currently, the commercially available pressure-sensitive adhesive layer further contains a peelable release liner for preventing adhesion of the pressure-sensitive adhesive layer when the waterproof coiled material is rolled up, and the release liner must be removed before the next step of construction, thereby causing some waste.

Another typical commercially available waterproof membrane is a waterproof membrane with a particle coating, in which the particles are usually silica and hydrated white cement particles, and the waterproof membrane has the disadvantage that the particles often fall off in use thereof, which easily results in unfirm adhesion with concrete, leading to water running from the waterproof layer and a waterproof failure. For example, Chinese Patent No. CN01814107.2, which belongs to the prior art, discloses a particle coating bonding system for hydratable cement composition casting and a preparation method thereof. The coated article comprises a body having at least one surface for carrying particles, said surface comprises a pressure-sensitive adhesive or elastomer, and said particles are inorganic particles capable of reacting with hydroxide solution generated from the hydration of concrete or mortar, or said particles comprise coagulants effectively increasing the rate of hydration reaction. Said inorganic particles comprise (a) aluminum oxide trihydrate; (b) silicon dioxide; (c) fly ash; (d) blast furnace slag, (e) forged silicon dioxide; (f) alkali or alkaline earth metal nitrite, nitrate, halide, sulfate, hydroxide, carboxylate, silicate, or aluminate, or mixture thereof. However, the particles easily fall off from the coated bonding system in the use thereof so that it is not firmly adhered to concrete, which easily causes water running from the waterproof layer. Chinese Patent No. CN201080063366.3 discloses a waterproof membrane that closely clings to concrete cast and bonds to it. The waterproof membrane includes a flexible carrier sheet, a pressure sensitive adhesive and reflective particles on the surface of the adhesive. The reflective particles should have an average diameter equal to or greater than the thickness of the pressure sensitive adhesive. Preferably, the reflective particles are ground white cement, or ground hydrated white cement. The waterproof membrane does not have a removable antisticking layer, which is typically used to prevent the adhesive portion of the waterproof membrane from adhering to the carrier sheet or other portion of the membrane when the membrane is rolled up. However, the particles easily fall off from the waterproof membrane in the use thereof so that it is not firmly adhered to concrete, which easily causes the problem of water running from the waterproof layer.

DISCLOSURE OF THE INVENTION

In view of the problem that particles easily fall off from the prior waterproof membrane in the use thereof, the present invention provides an organic-inorganic composite waterproof coating and a preparation method of the same.

The technical solution adopted for solving the technical problem in the present invention is as follows:

A polyacrylic acid copolymer emulsion, comprising, in parts by weight, components of:

10 to 50 parts of water, 0 to 60 parts of a solubilizer, 0 to 5 parts of a dispersant, 0 to 5 parts of a wetting agent, 5 to 50 parts of an acrylic emulsion, 0 to 5 parts of a film-forming additive, 0 to 5 parts of a preservative, 0 to 5 parts of a silane coupling agent, 0 to 1.0 part of an ultraviolet absorbent, 5 to 70 parts of a pigment, 0 to 5 parts of an antimildew agent, 0 to 2 parts of a defoamer, and 0 to 5 parts of a leveling agent.

Preferably, the polyacrylic acid copolymer emulsion comprises, in parts by weight, components of: 19 to 26 parts of water, 0.5 to 5 parts of the solubilizer, 0.1 to 0.5 part of the dispersant, 0.1 to 0.5 part of the wetting agent, 28 to 30 parts of the acrylic emulsion, 0.1 to 1 part of the film-forming additive, 0.2 to 0.3 part of the preservative, 0.5 to 0.6 part of the silane coupling agent, 0.5 to 0.6 part of the ultraviolet absorbent, 40 to 45 parts of the pigment, 0.1 to 0.5 part of the antimildew agent, 0.1 to 0.2 part of the defoamer, and 0.1 to 0.8 part of the leveling agent.

Preferably, the polyacrylic acid copolymer emulsion comprises, in parts by weight, components of:

19 parts of water, 1.5 parts of the solubilizer, 0.5 part of the dispersant, 0.2 part of the wetting agent, 30 parts of the acrylic emulsion, 1 part of the film-forming additive, 0.2 part of the preservative, 0.5 part of the silane coupling agent, 0.6 part of the ultraviolet absorbent, 45 parts of the pigment, 0.5 part of the antimildew agent, 0.2 part of the defoamer, and 0.8 part of the leveling agent; or 26 parts of water, 1.5 parts of the solubilizer, 0.4 part of the dispersant, 0.2 part of the wetting agent, 28 parts of the acrylic emulsion, 1 part of the film-forming additive, 0.3 part of the preservative, 0.6 part of the silane coupling agent, 0.5 part of the ultraviolet absorbent, 40 parts of the pigment, 0.5 part of the antimildew agent, 0.2 part of the defoamer, and 0.8 part of the leveling agent.

Preferably, the polyacrylic acid copolymer emulsion further comprises one or more of an ethylene-vinyl acetate copolymer and a styrene butadiene rubber.

The present invention further provides a method of preparing a polyacrylic acid copolymer emulsion described above, comprising the steps of:

adding 0 to 60 parts of a solubilizer, 0 to 5 parts of a dispersant, and 0 to 5 parts of a wetting agent to 5 to 30 parts of water while stirring at a low speed, and after the uniform dispersion of the mixture, adding 5 to 70 parts of a pigment and dispersing the obtained mixture at high speed for 15 to 20 minutes to provide a dispersion solution;

sequentially adding 5 to 50 parts of an acrylic emulsion and 0 to 5 parts of an antimildew agent to the dispersion solution while stirring at a moderate speed and dispersing the mixture for 5 to 10 minutes, and then sequentially adding 0 to 50 parts of a film-forming additive, 0 to 5 parts of an preservatives, 0 to 5 parts of a silane coupling agent, 0 to 1.0 part of an ultraviolet absorbent, and 0 to 2 parts of a defoamer and mixing and dispersing them for 5 to 10 minutes to provide a dispersed material;

pre-mixing 0 to 50 parts of a leveling agent and 5 to 20 parts of water uniformly in advance, slowly adding the pre-mixture to the above-mentioned dispersed material and stirring the obtained mixture at moderate speed for 15 minutes to provide a polyarylic acid copolymer emulsion. The present invention further provides an organic-inorganic composite waterproof coating, comprising a pressure-sensitive adhesive layer composed of a pressure-sensitive adhesive, an inorganic particle layer composed of inorganic particles, and a polymer layer, wherein the three layers are formed on a substrate sequentially from a bottom to a surface, wherein the polymer layer is formed by solidifying a polyacrylic acid copolymer emulsion, and the polyacrylic acid copolymer emulsion comprises, in parts by weight, components of:

10 to 50 parts of water, 0 to 60 parts of a solubilizer, 0 to 5 parts of a dispersant, 0 to 5 parts of a wetting agent, 5 to 50 parts of an acrylic emulsion, 0 to 5 parts of a film-forming additive, 0 to 5 parts of a preservative, 0 to 5 parts of a silane coupling agent, 0 to 1.0 part of an ultraviolet absorbent, 5 to 70 parts of a pigment, 0 to 5 parts of an antimildew agent, 0 to 2 parts of a defoamer, and 0 to 5 parts of a leveling agent.

Wherein, the substrate comprises a main waterproof sheet.

Preferably, the inorganic particles in the inorganic particle layer have a coverage rate of 70 to 100% on the pressure-sensitive adhesive layer, the polymer layer has a thickness of 1 to 100 microns, and the inorganic particles have a particle diameter of 500 to 700 microns.

Preferably, the inorganic particles in the inorganic particle layer have a coverage rate of 85 to 95% on the pressure-sensitive adhesive layer, the polymer layer has a thickness of 25 to 100 microns, and the inorganic particles have a particle diameter of 500 or 700 microns.

Preferably, the inorganic particles are made of one selected from the group consisting of calcite, quartzite, zeolite, vermiculite, aluminous soil, shale, feldspar, perlite, silicate and aluminate, or mixture of more than one of the group.

Preferably, the copolymer emulsion further comprises one or more of an ethylene-vinyl acetate copolymer and a styrene-butadiene rubber.

Preferably, the pressure-sensitive adhesive is one or more selected from the group consisting of butyl rubber-based adhesive, polyisobutylene-based adhesive, butyl group-based adhesive, acrylic acid-based adhesive, styrene-isoprene-styrene-based adhesive, styrene-ethylene-butylene-styrene-based adhesive, styrene-butadiene-styrene-based adhesive, styrene-butadiene rubber-based adhesive.

Preferably, the pressure-sensitive adhesive layer has a thickness in a range of 50 to 500 microns; the inorganic particles have a particle diameter of 100 to 1,000 microns, and a particle diameter gradation of the inorganic particles is of a bimodal distribution, a difference between the particle diameter of the inorganic particles with a volume percentage of 30 to 50% and the thickness of the pressure-sensitive adhesive layer is below 25% of the thickness of the pressure-sensitive adhesive layer, the particle diameter of the inorganic particles with a volume percentage of 50 to 70% is at least 25% or more larger than the thickness of the pressure-sensitive adhesive layer, and the inorganic particles have a coverage rate of 70 to 100% on the pressure-sensitive adhesive layer;

the polymer layer has a thickness of 1 to 100 microns, and the polymer layer has a coverage rate of 10 to 50% on the inorganic particle layer.

Preferably, the pressure-sensitive adhesive layer has a thickness in the range of 150 to 350 microns; the inorganic particles have a particle diameter of 200 to 700 microns; and the inorganic particles have a coverage rate of 70 to 100% on the pressure-sensitive adhesive layer; the polymer layer has a coverage rate of 25 to 35% on the surface of the inorganic particles.

Preferably, the pressure-sensitive adhesive layer has a thickness in the range of 200 to 325 microns.

Preferably, the inorganic particles are selected from aluminous soil particles, and two peaks of a particle diameter distribution of the aluminous soil particles are at 250 microns and 480 microns, respectively; or the inorganic particles are selected from shale particles, and two peaks of a particle diameter distribution of the shale particles are at 320 microns and 650 microns, respectively.

The present invention further provides a method of preparing an organic-inorganic composite waterproof coating, comprising the steps of:

heating a pressure-sensitive adhesive at 75 to 90° C. to make a viscosity of the pressure-sensitive adhesive be 25,000 to 40,000 cps, and utilizing the pressure-sensitive adhesive to coat a substrate to form a pressure-sensitive adhesive layer;

spreading inorganic particles on the pressure-sensitive adhesive layer and then utilizing a pressure roller to perform the roller coating, and removing the excess inorganic particles by one method selected from the group consisting of a gravity method, a vacuum method, and a sweeping and brushing method or by a combination of a plurality of methods selected from the group, so as to form an inorganic particle layer;

using a polyacrylic acid copolymer emulsion to coat a surface of the inorganic particle layer and drying the obtained product at a temperature of 60 to 80° C. for 1 to 2 minutes to provide a polymer layer; and thus completing the preparation of the organic-inorganic composite waterproof coating.

Wherein, the polyacrylic acid copolymer emulsion comprises, in parts by weight, components of:

10 to 50 parts of water, 0 to 60 parts of a solubilizer, 0 to 5 parts of a dispersant, 0 to 5 parts of a wetting agent, 5 to 50 parts of an acrylic emulsion, 0 to 5 parts of a film-forming additive, 0 to 5 parts of a preservative, 0 to 5 parts of a silane coupling agent, 0 to 1.0 part of an ultraviolet absorbent, 5 to 70 parts of a pigment, 0 to 5 parts of an antimildew agent, 0 to 2 parts of a defoamer, and 0 to 5 parts of a leveling agent.

The present invention further provides a macro-molecular self-adhesive film waterproof coiled material comprising a substrate and an organic-inorganic composite waterproof coating, the organic-inorganic composite waterproof coating comprises a pressure-sensitive adhesive layer composed of a pressure-sensitive adhesive, an inorganic particle layer composed of inorganic particles, and a polymer layer, wherein the three layers are formed on the substrate sequentially from a bottom to a surface, wherein the polymer layer is formed by solidifying a polyacrylic acid copolymer emulsion comprising, in parts by weight, components of:

10 to 50 parts of water, 0 to 60 parts of a solubilizer, 0 to 5 parts of a dispersant, 0 to 5 parts of a wetting agent, 5 to 50 parts of an acrylic emulsion, 0 to 5 parts of a film-forming additive, 0 to 5 parts of a preservative, 0 to 5 parts of a silane coupling agent, 0 to 1.0 part of an ultraviolet absorbent, 5 to 70 parts of a pigment, 0 to 5 parts of an antimildew agent, 0 to 2 parts of a defoamer, and 0 to 5 parts of a leveling agent.

The organic-inorganic composite waterproof coating of the present example is in a mode of composition of organic and inorganic particles, wherein the organic coating (polymer layer) seals the inorganic particles to prevent the inorganic particles from falling off in the long-term use, the particle diameter of the graded inorganic particles displays a bimodal distribution so that the problem of water running in underground engineering can be effectively solved, and the inorganic particles can also participate in the hydration reaction of cement to increase the strength of adhesion with the post-cast concrete; and moreover, the hybridization of the polymer with the inorganic particles can significantly improve the environment adaptability and weatherability; furthermore, the organic-inorganic composite waterproof coating according to the present invention does not need a protection layer, without an anti-sticking release liner and reducing waste and environmental pollution at the construction site. The organic-inorganic composite waterproof coating according to the present invention is used for a macromolecular self-adhesive film waterproof coiled material, allowing the coiled material to be properly exposed before concrete casting and providing a non-adhesive surface for the constructors to walk on meanwhile. Experiments have demonstrated that the organic-inorganic composite waterproof coating according to the present invention can still have a peeling strength up to 2.0 N/mm or greater after being exposed to the sunshine for 8 weeks.

DETAILED DESCRIPTION OF EMBODIMENTS

Figure 1:
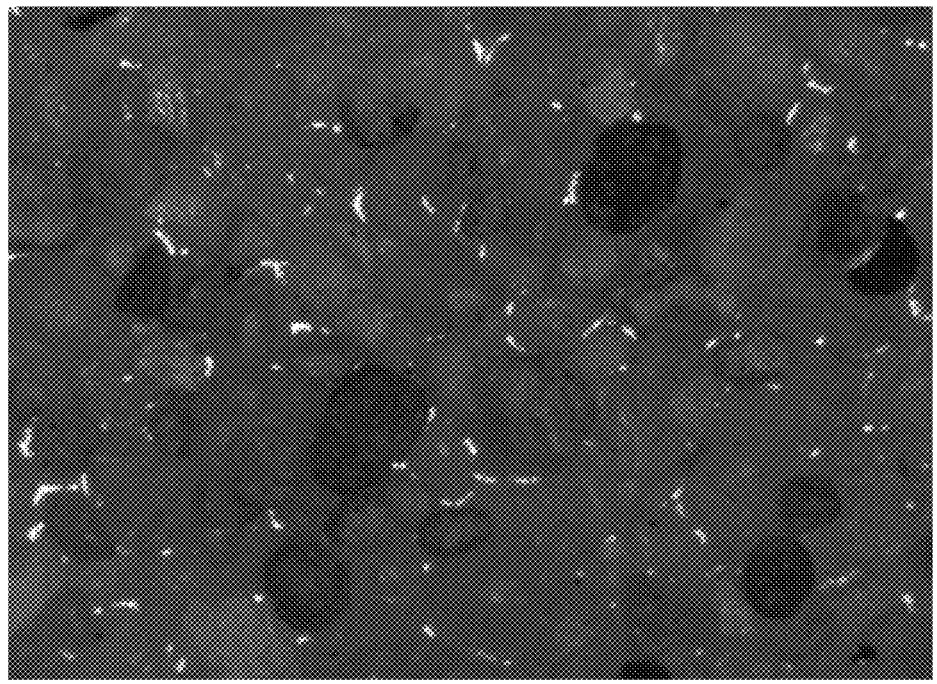
FIG. 1 is a picture of particles of a waterproof coating of Example 1, which are not coated with an organic coating, under a microscope.
Figure 2:
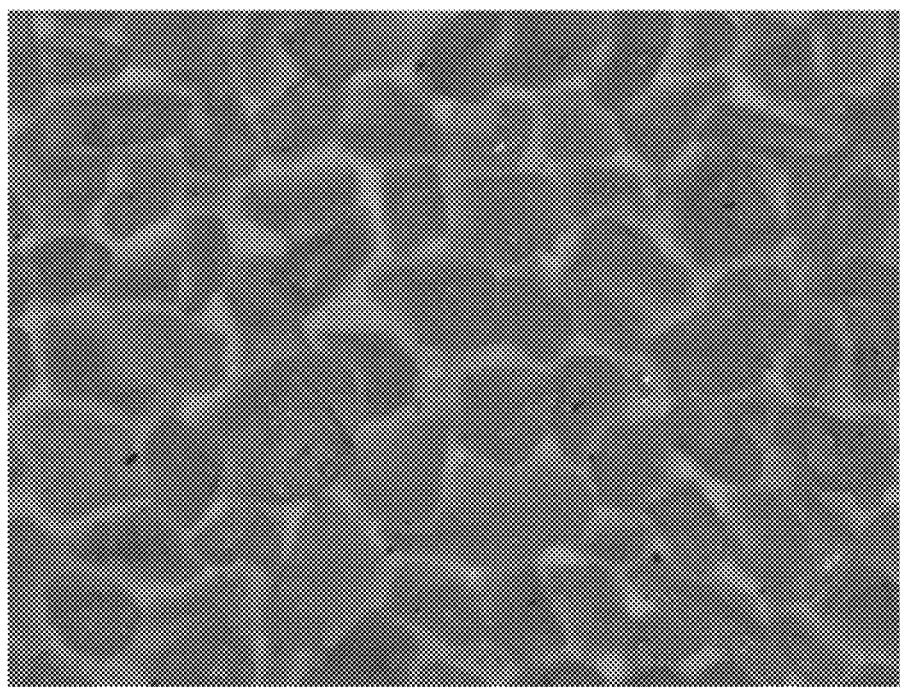
FIG. 2 is a picture of particles of a waterproof coating of Example 1, after being covered with an organic substance, under a microscope.

The present invention will now be described in further detail with reference to the accompanying drawings and specific embodiments in order to allow those skilled in the art to better understand the technical solutions of the present invention.

Wherein, "acrylic emulsion" in the present invention refers to an emulsion formed by dispersing polyacrylic acid compounds in water, as which commercially available products may be used.

Wherein, "inorganic particles having a coverage rate of 70 to 100% on a pressure-sensitive adhesive layer" means that one layer of the inorganic particles is spread uniformly on the pressure-sensitive adhesive layer, but there is no inorganic particles on part of the surface of the pressure-sensitive adhesive layer when the amount of the inorganic particles is insufficient to completely cover the surface of the pressure-sensitive adhesive layer. Nevertheless, it should be understood that the surface with the inorganic particles and the surface without the inorganic particles are uniformly distributed.

Wherein, "a polymer layer having a coverage rate of 25 to 35% on the surface of the inorganic particles" means that the polymer layer is formed on the inorganic particles, but some of the inorganic particles may be exposed from the polymer layer since the particle diameter of the inorganic particles may be larger than the polymer layer.

EXAMPLE 1

The present example provides an organic-inorganic composite waterproof coating, which is prepared by the following method:

(1) Firstly, a butyl rubber-based adhesive produced by Shanghai Kejian Chemical Co., Ltd., with a Model No. TOP BEST-KJ FLEX, was heated at 75° C. to have a viscosity of 40,000 cps, and then used to coat a commercially available main waterproof sheet to form a pressure-sensitive adhesive layer with a thickness of 400 microns;

(2) commercially available perlite mineral particles with a particle diameter of 500 microns were spread uniformly on the surface of the pressure-sensitive adhesive layer, and then roller-coated with particles by a pressure roller so that the mineral particles were embedded uniformly in the pressure-sensitive adhesive layer, and the perlite mineral particles had a coverage rate of 85% on the pressure-sensitive adhesive layer;

(3) the excess particles were removed by sweeping and brushing method to provide an inorganic particle layer;

(4) then a polyacrylic acid copolymer emulsion was uniformly coated on the surface of the inorganic particle layer by means of spraying, and was dried in a drying device at 60° C., for 2 minutes and the coating thickness was 0.05 to 0.1 mm to provide a polymer layer; and thus, the preparation of the organic-inorganic composite waterproof coating was completed.

Among them, the formulation of the polyacrylic acid copolymer emulsion was shown in Table 1:

TABLE 1

Formulation of Polyacrylic Acid Copolymer Emulsion of Example 1

| Names of Raw Materials | Specification | Supplier | Amount Used (Parts) |
| --- | --- | --- | --- |
| Water | Deionized water | — | 19 |
| Solubilizer | Commercially available | Commercially available | 1.5 |
| Dispersant | 5040 | Nopco | 0.5 |
| Wetting agent | FN211 | Elementis | 0.2 |
| Film-forming additive | Texanol | Eastman | 1 |
| Preservative | MV | Thor | 0.2 |
| Silane coupling agent | | Commercially available | 0.5 |
| Ultraviolet absorbent | | Commercially available | 0.6 |
| Antimildew agent | EPW | Thor | 0.5 |
| Defoamer | NXZ | Nopco | 0.2 |
| Titanium dioxide | R996 | Lomon | 5 |
| Ground calcium carbonate | 400 meshes | Commercially available | 40 |
| Acrylic emulsion | AE960 | Lubrizol | 30 |
| Leveling agent | RM-8W | Dow | 0.8 |
| Total | | | 100 |

The polyacrylic acid copolymer emulsion is prepared by the following process procedures:

(1) 10 parts of water were accurately weighed and added, a solubilizer, a dispersant, and a wetting agent were added according to the components of Table 1 while being stirred at a low speed, and after they were dispersed uniformly, titanium dioxide and ground calcium carbonate were added. The mixture was dispersed at a high speed for 15 minutes so that its fineness was tested to be acceptable.

(2) An acrylic emulsion and an antimildew agent were added sequentially while being stirred at moderate speed and were dispersed for 5 minutes to be uniform, and then a film-forming additive, a preservative, a silane coupling agent, an ultraviolet absorbent, and a defoamer were added sequentially and mixed and dispersed for 5 minutes.

(3) A leveling agent and 9 parts of water were added slowly to the dispersed material and stirred at a moderate speed for 15 minutes (the moderate speed was determined based on the fact that the dispersion was swirled but not rolled up and down and the surrounding materials could be mixed therein), until there were only minimal microbubbles.

(4) The emulsion was packaged after passing the inspection.

The organic-inorganic composite waterproof coating of the present example is in a mode of composition of organic and inorganic particles, wherein the organic coating (polymer layer) seals the inorganic particles to prevent the inorganic particles from falling off in the long-term use, the particle diameter of the graded inorganic particles displays a bimodal distribution so that the problem of water running in underground engineering can be effectively solved, and the inorganic particles can also participate in the hydration reaction of cement to increase the strength of adhesion with the post-cast concrete; and moreover, the hybridization of the polymer with the inorganic particles can significantly improve the environment adaptability and weatherability; furthermore, the organic-inorganic composite waterproof coating according to the present invention does not need a protection layer, without an anti-sticking release liner and reducing waste and environmental pollution at the construction site. The organic-inorganic composite waterproof coating according to the present invention is used for a macromolecular self-adhesive film waterproof coiled material, allowing the coiled material to be properly exposed before concrete casting and providing a non-adhesive surface for the constructors to walk on meanwhile. Experiments have demonstrated that the organic-inorganic composite waterproof coating according to the present invention can still have a peeling strength up to 2.0 N/mm or greater after being exposed to the sunshine for 8 weeks.

EXAMPLE 2

The present example provides an organic-inorganic composite waterproof coating, which is prepared by the following method:

(1) Firstly, a styrene-ethylene-butylene-styrene (SEBS)-based adhesive produced by Shanghai Rheo Technology Co., Ltd., with a Model No. P073-9, was heated at a temperature of 90° C. to have a viscosity of 25,000 cps, and then used to coat a main waterproof sheet to form a pressure-sensitive adhesive layer with a thickness of 50 microns;

(2) commercially available shale mineral particles with a particle diameter of 700 microns were spread uniformly on the surface of the pressure-sensitive adhesive layer, and then roller-coated with particles by a pressure roller so that the mineral particles were embedded uniformly in the pressure-sensitive adhesive layer, and had a coverage rate of 85% to 95%.

(3) Then, the excess particles were removed by air blowing method to provide an inorganic particle layer;

(4) then a polyacrylic acid copolymer emulsion was uniformly coated on the surface of the inorganic particle layer by means of brush coating, and was dried in a drying device at 80° C. for 1 minute and the coating thickness was 0.025 to 0.1 mm to provide a polymer layer; and thus, the preparation of the organic-inorganic composite waterproof coating was completed.

The formulation of the polyacrylic acid copolymer emulsion was shown in Table 2:

TABLE 2

Formulation of Polyacrylic Acid Copolymer Emulsion of Example 2

| Names of Raw Materials | Specification | Supplier | Amount Used (Parts) |
|---|---|---|---|
| Water | Deionized water | — | 26 |
| Solubilizer | Commercially available | Commercially available | 1.5 |
| Dispersant | A40 | BASF | 0.4 |
| Wetting agent | CF10 | Dow | 0.2 |
| Film-forming additive | Texanol | Eastman | 1 |
| Preservative | MV | Thor | 0.3 |
| Silane coupling agent | | Commercially available | 0.6 |
| Ultraviolet absorbent | | Commercially available | 0.5 |
| Antimildew agent | EPW | Thor | 0.5 |
| Defoamer | 7010 | Elementis | 0.2 |
| Titanium dioxide | R902 | Dupont | 10 |
| Ground calcium carbonate | 400 meshes | Commercially available | 30 |
| Acrylic emulsion | AE960 | Lubrizol | 28 |
| Leveling agent | RM-8W | Dow | 0.8 |
| Total | | | 100 |

The polyacrylic acid copolymer emulsion is prepared by the following process procedures:

(1) 20 parts of water were accurately weighed and added, 1.5 parts of a solubilizer, 0.4 part of a dispersant, and 0.2 part of a wetting agent were added while being stirred at low speed, and after they were dispersed uniformly, 10 parts of titanium dioxide and 30 parts of ground calcium carbonate were added. The mixture was dispersed at a high speed for 20 minutes so that its fineness was tested to be acceptable.

(2) 28 parts of an acrylic emulsion and 0.5 part of an antimildew agent were added sequentially while being stirred at moderate speed and were dispersed for 10 minutes to be uniform, and then 1 part of a film-forming additive, 0.3 part of a preservative, 0.6 part of a silane coupling agent, 0.5 part of an ultraviolet absorbent, and 0.2 part of a defoamer were added sequentially and mixed and dispersed for 10 minutes.

(3) 0.8 part of a leveling agent and 6 parts of water were added slowly to the dispersed material and stirred at a moderate speed for 15 minutes (the moderate speed was determined based on the fact that the dispersion was swirled but not rolled up and down and the surrounding materials could be mixed therein), until there were only minimal microbubbles.

(4) The emulsion was packaged after passing the inspection.

EXAMPLE 3

(1) Firstly, a polyisobutene-based adhesive was heated at a temperature of 80° C. to have a viscosity of 30,000 cps, and then used to coat to a main waterproof sheet to form a pressure-sensitive adhesive layer with a thickness of 500 microns;

(2) shale mineral particles with a particle diameter of 700 microns were spread uniformly on the surface of the pressure-sensitive adhesive layer, and then roller-coated with particles by a pressure roller so that the mineral particles were embedded uniformly in the pressure-sensitive adhesive layer, and had a coverage rate of 90%.

(3) Then, the excess particles were removed by air blowing method;

(4) then an ethylene-vinyl acetate copolymer emulsion was uniformly coated on the surface of the inorganic particle layer by means of brush coating, and was dried in a drying device at 70° C. for 2 minutes and the coating thickness was 0.05 to 0.1 mm.

EXAMPLE 4

(1) Firstly, a butyl-based adhesive, an acrylic-based adhesive, a styrene-isoprene-styrene (SIS)-based adhesive, a styrene-butadiene-styrene (SBS)-based adhesive, and a styrene-butadiene rubber (SBR)-based adhesive were mixed and then heated at a temperature of 80° C. to have a viscosity of 30,000 cps, and then used to coat to a main waterproof sheet to form a pressure-sensitive adhesive layer, and shale mineral particles with a particle diameter of 700 microns were spread uniformly on the surface of the pressure-sensitive adhesive layer, and then roller-coated by a pressure roller so that the mineral particles were embedded uniformly in the pressure-sensitive adhesive layer, and had a coverage rate of 95%.

(2) Then, the excess particles were removed by air blowing method to obtain an inorganic particle layer;

(3) then a polyacrylic acid copolymer emulsion, an ethylene-vinyl acetate copolymer, and a styrene-butadiene rubber were mixed and then uniformly coated on the surface of the inorganic particle layer by means of brush coating, and was dried in a drying device at 70° C. for 1 minute and the coating thickness was 0.05 to 0.1 mm to provide a polymer layer; and thus, the preparation of the organic-inorganic composite waterproof coating was completed.

Application Examples: the organic-inorganic composite waterproof coatings of Example 1 and Example 2 were post-cast with concrete, and then the main waterproof sheet was subjected to peeling strength test.

The organic-inorganic composite waterproof coatings of Example 1 and Example 2 were post-cast with concrete, and they were subjected to peeling strength test after being exposed to the sunshine for 4 weeks and 8 weeks, respectively.

Meanwhile, waterproof coatings of Comparative Example 1 and Comparative Example 2 were prepared, wherein the preparation method of the waterproof coating of Comparative Example 1 was similar to that of Example 1 except that the waterproof coating of Comparative Example 1 was not coated with a polymer layer. The preparation method of the waterproof coating of Comparative Example 2 was similar to that of Example 2 except that the waterproof coating of Comparative Example 2 was not coated with a polymer layer.

The organic-inorganic composite waterproof coatings of Comparative Example 1 and Comparative Example 2 were post-cast with concrete according to the method described above, and then they were subjected to peeling strength test.

Results of test of peeling strengths of Example 1, Example 2 and Comparative Example 1, and Comparative Example 2 are shown in Table 3.

TABLE 3

Peeling Strength Test Results (Unit: N/mm)

| Test Condition | Comparative Example 2 Shale Particle Layer | Example 2 Shale Particle Layer + Polymer Layer | Comparative Example 1 Perlite Particle Layer | Example 1 Perlite Particle Layer + Polymer Layer |
|---|---|---|---|---|
| Sample not processed | 3.3 | 3.3 | 3.4 | 3.5 |
| Placed for 4 weeks | 2.5 | 2.9 | 2.7 | 3.0 |
| Placed for 8 weeks | 1.4 | 2.0 | 1.3 | 2.5 |

As can be seen from Table 3, the waterproof coating obtained by the composition of the shale particle layer and the polymer layer and the waterproof coating obtained by the composition of the perlite particle layer and the polymer layer can still have a peeling strength up to 2.0 N/mm or more even after being exposed to the sunshine for 8 weeks, thus it can be seen that the hybridization of the polymer layer and the inorganic particles significantly improves the environmental adaptability and weatherability of the organic-inorganic composite waterproof coating.

EXAMPLE 5

The present example provides a polyacrylic acid copolymer emulsion comprising the following parts by weight of raw materials:

10 parts of water, 1 part of a solubilizer, 0.1 part of a dispersant, 0.1 part of a wetting agent, 5 parts of an acrylic emulsion, 0.1 part of a film-forming additive, 0.1 part of a preservative, 0.1 part of a silane coupling agent, 0.1 part of an ultraviolet absorbent, 5 parts of a pigment, 0.1 part of an antimildew agent, 0.1 part of a defoamer, and 0.1 part of a leveling agent.

EXAMPLE 6

The present example provides a polyacrylic acid copolymer emulsion comprising the following parts by weight of raw materials:

50 parts of water, 60 parts of a solubilizer, 5 parts of a dispersant, 5 parts of a wetting agent, 50 parts of an acrylic emulsion, 5 parts of a film-forming additive, 5 parts of a preservative, 5 parts of a silane coupling agent, 1.0 part of an ultraviolet absorbent, 70 parts of a pigment, 5 parts of an antimildew agent, 2 parts of a defoamer, and 5 parts of a leveling agent.

An organic-inorganic composite waterproof coating obtained by being coated with the polyacrylic acid copolymer emulsion prepared in Example 5 or 6 according to the method of Example 1 has similar properties to those of Example 1.

EXAMPLE 7

The present example provides an organic-inorganic composite waterproof coating, which is prepared by a method similar to that of Example 1, and Example 7 is different from Example 1 in that, the pressure-sensitive adhesive layer has an average thickness in the range of 150 microns;

the particle diameter gradation of the inorganic particles is of a bimodal distribution, 30% of the inorganic particles have a particle diameter close to 150 microns, and 70% of the inorganic particles have a particle diameter of 200 microns, and the inorganic particles have a coverage rate of 70% on the pressure-sensitive adhesive layer; and the polymer layer has a thickness of 1 micron, and the polymer layer has a coverage rate of 10% on the inorganic particle layer.

EXAMPLE 8

The present example provides an organic-inorganic composite waterproof coating, which is prepared by a method similar to that of Example 1, and Example 8 is different from Example 1 in that, the pressure-sensitive adhesive layer has an average thickness in the range of 350 microns;

the particle diameter gradation of the inorganic particles is of a bimodal distribution, 50% of the inorganic particles have a particle diameter of 350 microns, and 50% of the inorganic particles have a particle diameter of 700 microns, and the inorganic particles have a coverage rate of 100% on the pressure-sensitive adhesive layer; and the polymer layer has a thickness of 100 microns, and the polymer layer has a coverage rate of 50% on the inorganic particle layer.

EXAMPLE 9

The present example provides an organic-inorganic composite waterproof coating, which is prepared by a method similar to that of Example 1, and Example 9 is different from Example 1 in that, the inorganic particles are selected from aluminous soil particles, the peaks of the particle diameters of the bimodal distribution of aluminous soil particles were 250 microns and 480 microns, respectively.

EXAMPLE 10

The present example provides an organic-inorganic composite waterproof coating, which is prepared by a method similar to that of Example 1, and Example 10 is different from Example 1 in that, the inorganic particles are selected from shale particles, the peaks of the particle diameters of the bimodal distribution of shale particles were 320 microns and 650 microns, respectively.

Obviously, the specific embodiments of the above respective examples may be subjected to many variations; and for example, the specific parts by weight of each of the raw materials of the polyacrylic acid copolymer emulsion may be adjusted or varied, or the specific type or model number of the pressure sensitive adhesive may be adjusted according to the actual situation.

It is to be understood that the above embodiments are merely exemplary embodiments used for illustrating the principle of the present invention, but the present invention is not limited thereto. It will be apparent to those skilled in the art that various changes and modifications can be made without departing from the spirit and essence of the present invention, which are also considered to be within the scope of protection of the present invention.

The invention claimed is:

1. A polyacrylic acid copolymer emulsion comprising, in parts by weight, components of:
19 to 26 parts of water, 0.5 to 5 parts of a solubilizer, 0.1 to 0.5 part of a dispersant, 0.1 to 0.5 part of a wetting agent, 28 to 30 parts of an acrylic emulsion, 0.1 to 1 part of a film-forming additive, 0.2 to 0.3 part of a preservative, 0.5 to 0.6 part of a silane coupling agent, 0.5 to 0.6 part of an ultraviolet absorbent, 40 to 45 parts of a pigment, 0.1 to 0.5 part of an antimildew agent, 0.1 to 0.2 part of a defoamer, and 0.1 to 0.8 part of a leveling agent.

2. The polyacrylic acid copolymer emulsion according to claim 1, comprising, in parts by weight, components of:
19 parts of water, 1.5 parts of the solubilizer, 0.5 part of the dispersant, 0.2 part of the wetting agent, 30 parts of the acrylic emulsion, 1 part of the film-forming additive, 0.2 part of the preservative, 0.5 part of the silane coupling agent, 0.6 part of the ultraviolet absorbent, 45 parts of the pigment, 0.5 part of the antimildew agent, 0.2 part of the defoamer, and 0.8 part of the leveling agent;

or 26 parts of water, 1.5 parts of the solubilizer, 0.4 part of the dispersant, 0.2 part of the wetting agent, 28 parts of the acrylic emulsion, 1 part of the film-forming additive, 0.3 part of the preservative, 0.6 part of the silane coupling agent, 0.5 part of the ultraviolet absorbent, 40 parts of the pigment, 0.5 part of the antimildew agent, 0.2 part of the defoamer, and 0.8 part of the leveling agent.

3. The polyacrylic acid copolymer emulsion according to claim 1, further comprising one or more of an ethylene-vinyl acetate copolymer and a styrene butadiene rubber.

4. An organic-inorganic composite waterproof coating, comprising a pressure-sensitive adhesive layer composed of a pressure-sensitive adhesive, an inorganic particle layer composed of inorganic particles, and a polymer layer, wherein the three layers are formed on a substrate sequentially from a bottom to a surface,
wherein the polymer layer is formed by solidifying a polyacrylic acid copolymer emulsion, and the polyacrylic acid copolymer emulsion comprises, in parts by weight, components of:
19 to 26 parts of water, 0.5 to 5 parts of a solubilizer, 0.1 to 0.5 part of a dispersant, 0.1 to 0.5 part of a wetting agent, 28 to 30 parts of an acrylic emulsion, 0.1 to 1 part of a film-forming additive, 0.2 to 0.3 part of a preservative, 0.5 to 0.6 part of a silane coupling agent, 0.5 to 0.6 part of an ultraviolet absorbent, 40 to 45 parts of a pigment, 0.1 to 0.5 part of an antimildew agent, 0.1 to 0.2 part of a defoamer, and 0.1 to 0.8 part of a leveling agent.

5. The organic-inorganic composite waterproof coating according to claim 4, wherein the inorganic particles in the inorganic particle layer have a coverage rate of 70 to 100% on the pressure-sensitive adhesive layer, the polymer layer has a thickness of 1 to 100 microns, and the inorganic particles have a particle diameter of 500 to 700 microns.

6. The organic-inorganic composite waterproof coating according to claim 5, wherein the inorganic particles in the inorganic particle layer have a coverage rate of 85 to 95% on the pressure-sensitive adhesive layer, the polymer layer has a thickness of 25 to 100 microns, and the inorganic particles have a particle diameter of 500 or 700 microns.

7. The organic-inorganic composite waterproof coating according to claim 4, wherein the inorganic particles are made of one selected from the group consisting of calcite, quartzite, zeolite, vermiculite, aluminous soil, shale, feldspar, perlite, silicate and aluminate, or mixture of more than one of the group.

8. The organic-inorganic composite waterproof coating according to claim 4, wherein the pressure-sensitive adhesive is one or more selected from the group consisting of butyl rubber-based adhesive, polyisobutylene-based adhesive, butyl group-based adhesive, acrylic acid-based adhesive, styrene-isoprene-styrene-based adhesive, styrene-ethylene-butylene-styrene-based adhesive, styrene-butadiene-styrene-based adhesive, styrene-butadiene rubber-based adhesive.

9. The organic-inorganic composite waterproof coating according to claim 4, wherein the pressure-sensitive adhesive layer has a thickness in a range of 50 to 500 microns;
the inorganic particles have a particle diameter of 100 to 1,000 microns, and a particle diameter gradation of the inorganic particles is of a bimodal distribution, a difference between the particle diameter of the inorganic particles with a volume percentage of 30 to 50% and the thickness of the pressure-sensitive adhesive layer is below 25% of the thickness of the pressure-sensitive adhesive layer, the particle diameter of the inorganic particles with a volume percentage of 50 to 70% is at least 25% or more larger than the thickness of the pressure-sensitive adhesive layer, and the inorganic particles have a coverage rate of 70 to 100% on the pressure-sensitive adhesive layer;
the polymer layer has a thickness of 1 to 100 microns, and the polymer layer has a coverage rate of 10 to 50% on the inorganic particle layer.

10. The organic-inorganic composite waterproof coating according to claim 9, wherein the pressure-sensitive adhesive layer has a thickness in the range of 150 to 350 microns;
the inorganic particles have a particle diameter of 200 to 700 microns; and the inorganic particles have a coverage rate of 70 to 100% on the pressure-sensitive adhesive layer;
the polymer layer has a coverage rate of 25 to 35% on the surface of the inorganic particles.

11. The organic-inorganic composite waterproof coating according to claim 10, wherein the pressure-sensitive adhesive layer has a thickness in the range of 200 to 325 microns.

12. The organic-inorganic composite waterproof coating according to claim 11, wherein the inorganic particles are selected from aluminous soil particles, and two peaks of a particle diameter distribution of the aluminous soil particles are at 250 microns and 480 microns, respectively; or
the inorganic particles are selected from shale particles, and two peaks of a particle diameter distribution of the shale particles are at 320 microns and 650 microns, respectively.

13. A macro-molecular self-adhesive film waterproof coiled material comprising a substrate and an organic-inorganic composite waterproof coating, the organic-inorganic composite waterproof coating comprises a pressure-sensitive adhesive layer composed of a pressure-sensitive adhesive, an inorganic particle layer composed of inorganic particles, and a polymer layer, wherein the three layers are formed on the substrate sequentially from a bottom to a surface,
wherein the polymer layer is formed by solidifying a polyacrylic acid copolymer emulsion comprising, in parts by weight, components of:
19 to 26 parts of water, 0.5 to 5 parts of a solubilizer, 0.1 to 0.5 part of a dispersant, 0.1 to 0.5 part of a wetting agent, 28 to 30 parts of an acrylic emulsion, 0.1 to 1 part of a film-forming additive, 0.2 to 0.3 part of a preservative, 0.5 to 0.6 part of a silane coupling agent, 0.5 to 0.6 part of an ultraviolet absorbent, 40 to 45 parts of a pigment, 0.1 to 0.5 part of an antimildew agent, 0.1 to 0.2 part of a defoamer, and 0.1 to 0.8 part of a leveling agent.

14. A method for preparing an organic-inorganic composite waterproof coating, comprising the steps of:
heating a pressure-sensitive adhesive at 75 to 90° C. to make a viscosity of the pressure-sensitive adhesive be 25,000 to 40,000 cps, and utilizing the pressure-sensitive adhesive to coat a substrate to form a pressure-sensitive adhesive layer;
spreading inorganic particles on the pressure-sensitive adhesive layer and then utilizing a pressure roller to perform the roller coating, and removing the excess inorganic particles by one method selected from the group consisting of a gravity method, a vacuum method, and a sweeping and brushing method or by a combination of a plurality of methods selected from the group, so as to form an inorganic particle layer;
using a polyacrylic acid copolymer emulsion to coat a surface of the inorganic particle layer and drying the obtained product at a temperature of 60 to 80° C. for 1 to 2 minutes to provide a polymer layer;
wherein the polyacrylic acid copolymer emulsion comprises, in parts by weight, components of:
19 to 26 parts of water, 0.5 to 5 parts of a solubilizer, 0.1 to 0.5 part of a dispersant, 0.1 to 0.5 part of a wetting agent, 28 to 30 parts of an acrylic emulsion, 0.1 to 1 part of a film-forming additive, 0.2 to 0.3 part of a preservative, 0.5 to 0.6 part of a silane coupling agent, 0.5 to 0.6 part of an ultraviolet absorbent, 40 to 45 parts of a pigment, 0.1 to 0.5 part of an antimildew agent, 0.1 to 0.2 part of a defoamer, and 0.1 to 0.8 part of a leveling agent.

* * * * *